United States Patent [19]

Järvenpää et al.

[11] 4,250,627
[45] Feb. 17, 1981

[54] COMPASS APPARATUS

[75] Inventors: Kauko Järvenpää, Helsinki; Pertti Leinonen; Jouko Räisänen, both of Espoo, all of Finland

[73] Assignee: Suunto Oy, Finland

[21] Appl. No.: 959,146

[22] Filed: Nov. 9, 1978

[30] Foreign Application Priority Data

Nov. 14, 1977 [FI] Finland ............................... 3440/77

[51] Int. Cl.³ ........................................... G01C 17/08
[52] U.S. Cl. ....................................... 33/364; 33/346
[58] Field of Search ............ 33/364, 346, 327, 355 R, 33/396; 220/85 B; 277/212 C, 212 R; 138/30

[56] References Cited

U.S. PATENT DOCUMENTS

| | | | |
|---|---|---|---|
| 3,043,465 | 7/1962 | Horner | 220/85 B X |
| 3,473,234 | 10/1969 | Kjellstrom et al. | 33/364 |
| 3,628,690 | 12/1971 | Sherman | 33/346 X |
| 3,949,483 | 4/1976 | White | 33/364 |

*Primary Examiner*—William D. Martin, Jr.
*Attorney, Agent, or Firm*—Steinberg & Raskin

[57] ABSTRACT

Compass apparatus includes a housing defining a liquid-filled sealed interior space and a compass card member disposed within the liquid-filled space for rotation therein. The housing comprises an upper transparent cover portion having an outwardly directed first flange extending around the perimeter thereof and a lower housing portion, preferably formed of elastic material, having an annular elastic flange extending around the periphery thereof, the upper surface of the latter flange abutting against the lower surface of the first flange in liquid sealing engagement therewith. A connecting ring having a U-shaped cross section maintains the abutting flanges in sealing engagement with each other thereby providing a housing which is simple to close and which may be reopened and reclosed as desired in a manner such that the integrity of the liquid seal is not impaired. A sealing ring member may be provided between the elastic flange of the lower housing portion and the lower flange of the connecting ring. Further, an inner wall portion having an outwardly directed flange may be provided such that the latter flange sealingly engages the flange of the cover portion to define a variable capacity liquid space.

11 Claims, 1 Drawing Figure

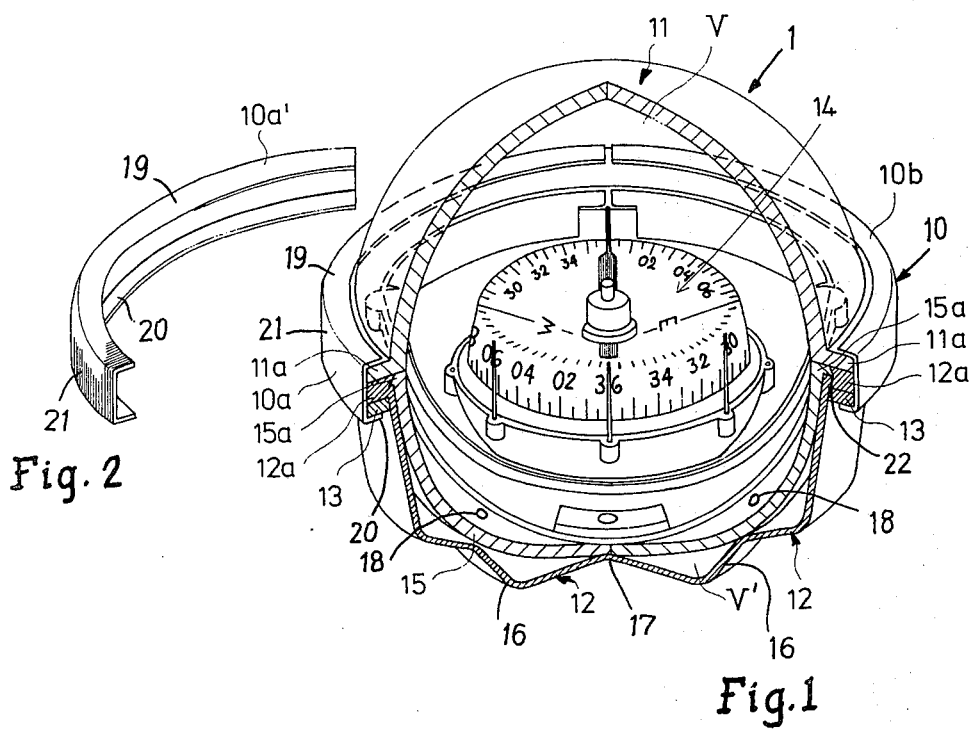

COMPASS APPARATUS

BACKGROUND OF THE INVENTION

This invention relates generally to compass apparatus and, more particularly, to compass apparatus of the type wherein a compass card member is rotatably disposed within a liquid-filled space defined within a housing having a transparent hemispherical or cupola-shaped cover portion.

Compass apparatus including a compass card member rotatably disposed within a liquid-filled space defined within a housing having an upper transparent cupola-shaped cover portion, hereinafter referred to as a cupola compass, are known. For example, a cupola compass apparatus is disclosed in Swedish Pat. No. 318,418 which includes a pair of hemispherically shaped members sealingly connected to define a liquid-tight interior in which a compass card member is rotatably mounted in an appropriate fluid. The hemispherical members are provided with peripherally extending flanges which are sealingly joined by a resilient sealed ring having a substantially V-shaped cross section. The V-shaped sealing ring sealingly couples the respective peripheral flanges of the pair of hemispherical members by means of two connecting yokes having a U-shaped cross section. However, the connecting yokes are permanently clamped in position in a manner such that the compass housing cannot be opened. Further, the hemispherically shaped housing members are formed of rigid, inelastic material and, for this reason, the V-shaped sealing ring has elastic properties which permits the capacity of the liquid-containing housing interior to change as the volume of the fluid in which the compass card member is disposed itself changes as a result, for example, of temperature changes.

Thus, the general state of the prior art is such that it is desireable to provide cupola compass apparatus which is both simple in construction and economical in manufacture and wherein access to the interior thereof is possible even after the hemispherical members are sealingly joined to each other so that the compass card member can be repaired.

SUMMARY OF THE INVENTION

Accordingly, one object of the present invention is to provide a new and improved cupola compass apparatus.

Another object of the present invention is to provide a new and improved cupola compass apparatus having a relatively simple construction.

Still another object of the present invention is to provide a new and improved cupola compass apparatus having an interior liquid-filled space whose capacity can change as the volume of the compass liquid changes.

A further object of the present invention is to provide a new and improved cupola compass apparatus which allows for access to the interior space thereof in a manner that the liquid sealed nature thereof is not impaired.

Briefly, in accordance with the present invention, these and other objects are attained by providing a compass apparatus including a housing having an upper transparent cover portion having an outwardly directed first flange extending around the periphery thereof which is sealed to a lower housing portion by connecting ring apparatus having a U-shaped cross section at least in part defined by an upper flange which abuts in sealing engagement with the peripheral flange of the cover portion. The lower housing portion is preferably also formed with a peripherally extending flange which abuts in sealing engagement with the lower surface of the cover portion flange to define the sealed interior space. Further, a sealing ring may be provided which abuts against the lower surface of the lower housing portion flange, the sealing ring being maintained in engagement with the flange by the lower flange of the connecting ring structure.

The lower housing portion is formed of an elastic material and an inner wall portion is further provided also having a peripherally extending flange which sealingly engages the upper cover portion flange to define a variable capacity liquid space between the inner wall portion and the lower housing portion.

DESCRIPTION OF THE DRAWING

A more complete appreciation of the invention and many of the attendant advantages thereof will be readily appreciated as the same becomes better understood by reference to the following detailed description when considered in connection with the accompanying drawings wherein:

FIG. 1 is a perspective view, partially broken away, of the cupola compass apparatus of the present invention; and FIG. 2 is a perspective view of a yoke in unassembled form for use in connection with the present invention.

DESCRIPTION OF THE PREFERRED EMBODIMENT

Referring now to the drawing, the cupola compass apparatus of the present invention, generally designated 1, includes a housing defined by an upper cover portion 11 sealingly engaged to a lower housing portion 12 defining a fluid sealed interior space V therein. Space V is filled with a suitable fluid, well known to those skilled in the art, and a compass card member 14 is disposed within the compass liquid for rotation therein in a conventional manner.

Upper cover portion 11 is formed of a transparent, rigid material, such as plastic, and has a substantially hemispherical shape terminating at its peripheral end region in an outwardly directed flange 11a.

The lower housing portion 12 is substantially cup-shaped and is formed of an elastic material. Alternating ridges and channels 16, 17 are formed in the wall of lower housing portion 12 for reasons described hereinbelow. The edge region of lower housing portion 12 also terminates in an outwardly directed peripherally extending flange 12a which, of course, is formed of the same elastic material as is the lower housing portion 12.

The upper surface of flange 12a of lower housing portion 12 sealingly engages the lower surface of flange 11a of the upper cover portion 11 thereby defining the sealed interior space V. It is noted that the radial extent of flange 12a of lower housing portion 12 is somewhat less than the corresponding radial extent of flange 11a of upper cover portion 11. Thus, upon flange 12a being located in sealing engagement with the radially outermost portion of the lower surface of flange 11a, a radially inner portion of flange 11a is not engaged by flange 12a.

An inner substantially hemispherical wall portion 15 is disposed within the lower housing portion 12, inner wall portion 15 terminating at its peripheral edge region with an outwardly directed flange 15a. The upper surface of flange 15a sealingly engages the inner portion of the lower surface of flange 11a of the upper cover portion 11 and, additionally, the flange 15a has a downwardly and outwardly bevelled terminal edge 22 which penetrates within the elastic material of flange 12a. By this construction, a second liquid space is defined between the inner wall portion 15 and the lower housing portion 12. If desired, the inner wall portion 15 may be supported within the lower housing portion 12 through a supporting contact of the outer surface of inner wall portion 15 being supportingly contacted by the inwardly facing regions of the channels 17 described above.

A series of apertures 18 are formed through inner wall portion 15 to provide fluid communication between the liquid-filled space V and the liquid space V'. Liquid space V' has a variable capacity in view of the elastic nature of lower housing portion 12 and which is further augmented by the ridge and channel construction thereof. Thus, should the temperature of the compass liquid within space V increase with a consequent increase in its volume, the capacity of liquid space V' will correspondingly increase by virtue of the elastic deformation of lower housing portion 12.

Upper cover portion 11 is fluid sealingly connected to lower housing portion 13 while inner wall portion 15 is fluidly sealed to both the upper cover portion 11 and to the lower housing portion 12 by a connecting ring 10 which, in the present embodiment, comprises three identically configured yokes 10a, 10b and 10c, the latter of which not being shown. Connecting ring 10 is formed of a resilient material and has a substantially U-shaped cross section. Thus, each yoke of connecting ring 10 is defined by upper and lower flanges 19, 20, respectively and a connecting web 21.

Prior to assembly, a sealing ring 13 is located around lower housing portion 12 so that its upper surface sealingly engages the lower surface of flange 12a of the lower housing portion 12. The assembly of a typical yoke 10a is illustrated in FIG. 2 wherein the latter is depicted in its unassembled condition as 10a'. Thus, on assembly, each yoke, e.g. yoke 10a is located over the assembly of mating flanges 11a, 12a, 15a and sealing ring 13 by squeezing the upper cover portion 11 and lower housing portion 12 together whereby the flange 12a of lower housing portion 12 will compress in view of its elastic nature. It is noted that by virtue of this compression, the flange 15a of inner wall portion 15 is placed in sealing engagement both with the flange 11a of upper cover portion 11 and with flange 12a of lower housing portion 12, the latter of which being accomplished by the penetration of the bevelled edge 22 of flange 15a into the elastic material of flange 12a. Thus, the upper flange of connecting ring 10 bears against the upper surface of flange 11a while the upper surface of lower flange 20 of connecting ring 10 bears against the lower surface of sealing ring 13. The distance between flanges 19, 20 of connecting ring 10 is such as to maintain the flange 12a in a compressed condition thereby assuring the fluid tight sealing of the compass housing. The elastic flange 12a is appropriately shaped so that it can be compressed in a manner so as to enable the yokes 10a, b, c, to be disposed over the mating flanges and sealing ring and to be held in place by the outwardly directed forces resulting from the elastic deformation of flange 12a.

It should be understood that although the connecting ring 10 has been shown in the preferred embodiment as comprising three identically configured yokes, it is within the scope of the invention to provide the connecting ring 10 of a single or a pair of rings or even of more than three such yokes.

Thus, it is seen that a compass apparatus is obtained according to the present invention which provides a reliable liquid-tight sealing connection of the upper cover portion and the lower housing portion. The cover and housing portions are easily sealed together or separated, as desired without detriment to the integrity of the liquid-tight seal obtained upon assembly. More particularly, the fluid-tight seal is obtained by merely pressing or squeezing the upper cover portion 11 and the elastic lower housing portion 12 toward each other in a manner such that the peripheral flange 12a of the lower housing portion is compressed whereupon the connecting yokes 10a, b, c, are located over the mating flanges and sealing ring. Thereupon, the squeezing pressure is removed so that the outwardly directed elastic returning forces presented by flange 12a serve to retain the connecting yokes in their position while maintaining the respective flanges in sealing engagement. Further, by providing the lower housing portion 12 of an elastic material, the liquid filled interior space within the housing has the capacity to expand in order to accommodate changes in temperature.

Obviously, numerous modifications and variations are possible in the light of the above teachings. Accordingly, it is understood that within the scope of the appended claims, the invention may be practiced otherwise than as specifically described herein.

What is claimed is:

1. Compass apparatus including a housing defining a liquid-filled sealed first interior space and a compass card member disposed within said liquid filled space for rotation therein, wherein said housing comprises:
   an upper transparent cover portion having an outwardly directed first flange extending around the perimeter thereof;
   a lower housing portion having an outwardly directed second flange formed of an elastic material, the upper surface of said second elastic flange being adapted to engage the lower surface of said first flange in liquid sealing engagement therewith so that said upper and lower housing portions define said sealed interior space therebetween; and
   connecting ring means for sealingly engaging said upper cover portion to said lower housing portion, said connecting ring means being defined by at least two arcuate yoke members, each yoke member having a U-shaped cross section defined by upper and lower marginal flanges and a connecting web integrally formed with said upper and lower marginal flanges, the upper one of said marginal flanges abutting against the upper surface of said first flange of said upper transparent cover portion and the lower one of said marginal flanges applying a compression force to said second elastic flange to compress the same so as to simultaneously removably affix said upper cover portion and lower housing portions to each other and to effect a liquid sealing engagement therebetween.

2. Compass apparatus as recited in claim 1 wherein said upper transparent cover portion comprises a substantially hemispherical cupola-shaped member.

3. Compass apparatus as recited in claim 1 wherein said lower housing portion is formed of elastic material adapted to expand and contract to change the volume of said interior space.

4. Compass apparatus as recited in claim 3 wherein said lower housing portion is substantially cup-shaped having ridges and channels formed therein.

5. Compass apparatus as recited in claim 1 further including a sealing ring member having an upper surface abutting against the lower surface of said lower housing portion elastic flange in liquid sealing engagement therewith, the lower one of said marginal flanges of said connecting ring means abutting against the lower surface of said sealing ring member.

6. Compass apparatus as recited in claim 1 wherein said connecting ring means comprises at least three arcuate yoke elements.

7. Compass apparatus as recited in claim 6 wherein each of said yoke elements is substantially identical to each of said other yoke elements.

8. Compass apparatus as recited in claim 1 further including an inner wall portion having an outwardly directed third, relatively non-elastic flange extending around the perimeter thereof, the upper surface of said third flange abutting against the lower surface of said first flange in liquid sealing engagement therewith, said inner wall portion and lower housing portion defining a variable capacity second liquid space within said first liquid space.

9. Compass apparatus as recited in claim 8 wherein said inner wall portion is substantially hemispherical in shape.

10. Compass apparatus as recited in claim 8 wherein apertures are formed in said inner wall portion to provide fluid communication between said first and second liquid spaces.

11. Compass apparatus as recited in claim 8 wherein said outwardly directed third flange terminates in a downwardly and outwardly bevelled edge which penetrates into said second flange.

* * * * *